US009403230B2

(12) United States Patent
Brückner et al.

(10) Patent No.: US 9,403,230 B2
(45) Date of Patent: Aug. 2, 2016

(54) METHOD FOR CONTROLLING A SPOT WELDING SYSTEM, INCLUDING THE DETERMINATION OF THE POSITION OF AN INSERTED ELEMENT IN A HOLLOW MEMBER; ASSOCIATED SPOT WELDING SYSTEM

(75) Inventors: Jan Brückner, Uttenreuth (DE); Martin Effert, Erlangen (DE); Joachim Franke, Nürnberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 532 days.

(21) Appl. No.: 13/878,273

(22) PCT Filed: Oct. 7, 2011

(86) PCT No.: PCT/EP2011/067560
§ 371 (c)(1),
(2), (4) Date: Apr. 8, 2013

(87) PCT Pub. No.: WO2012/049088
PCT Pub. Date: Apr. 19, 2012

(65) Prior Publication Data
US 2013/0186872 A1   Jul. 25, 2013

(30) Foreign Application Priority Data
Oct. 14, 2010  (DE) .......................... 10 2010 042 457

(51) Int. Cl.
B23K 9/00    (2006.01)
B23K 9/007   (2006.01)
B23K 31/02   (2006.01)
B23K 37/02   (2006.01)
(Continued)

(52) U.S. Cl.
CPC ................. *B23K 9/007* (2013.01); *B23K 31/02* (2013.01); *B23K 37/0276* (2013.01); *F22B 37/103* (2013.01); *B23K 2201/045* (2013.01); *B23K 2201/06* (2013.01); *B23K 2203/04* (2013.01); *F28F 1/405* (2013.01)

(58) Field of Classification Search
CPC ............ B23K 9/00; B23K 9/10; B23K 9/007; B23K 9/127
USPC ................................. 219/86.1, 127
See application file for complete search history.

(56) References Cited

U.S. PATENT DOCUMENTS 3,272,961 A     9/1966  Maier, Jr.
4,381,440 A  *  4/1983  Madewell ................ F28F 1/40
                                         219/125.11
(Continued)

FOREIGN PATENT DOCUMENTS

CN   101327547 A   12/2008
CN   101745720 A   6/2010
(Continued)

*Primary Examiner* — Dana Ross
*Assistant Examiner* — Ayub Maye

(57) ABSTRACT

A method of controlling a spot welding system used for attaching an inserted element in a hollow member is provided. A position of the inserted element in the hollow member is determined, the position of an attachment point is determined from the position of the inserted element in the hollow member, and a spot welding operation is performed at the attachment point. Further, a spot welding system for carrying out the method is provided.

7 Claims, 4 Drawing Sheets

(51) Int. Cl.
  *F22B 37/10* (2006.01)
  *F28F 1/40* (2006.01)

(56) References Cited

U.S. PATENT DOCUMENTS

| | | | |
|---|---|---|---|
| 5,504,299 A * | 4/1996 | Heckendorn | B23K 11/31 219/109 |
| 6,927,360 B2 * | 8/2005 | Artelsmair | B23K 9/1276 219/124.22 |
| 2009/0001056 A1 * | 1/2009 | Takahashi | B23K 11/315 219/86.7 |
| 2009/0095236 A1 * | 4/2009 | Franke | F22B 37/18 122/235.11 |
| 2010/0096375 A1 | 4/2010 | Daniel | |

FOREIGN PATENT DOCUMENTS

| | | |
|---|---|---|
| EP | 1245324 B1 | 4/2007 |
| EP | 1793164 A1 | 6/2007 |
| FR | 2724453 A1 | 3/1996 |
| JP | 62275575 A | 11/1987 |
| JP | 7060459 A | 3/1995 |
| JP | 2001170785 A | 6/2001 |
| JP | 2008279461 A | 11/2008 |

* cited by examiner

METHOD FOR CONTROLLING A SPOT WELDING SYSTEM, INCLUDING THE DETERMINATION OF THE POSITION OF AN INSERTED ELEMENT IN A HOLLOW MEMBER; ASSOCIATED SPOT WELDING SYSTEM

CROSS REFERENCE TO RELATED APPLICATIONS

This application is the US National Stage of International Application No. PCT/EP2011/067560 filed Oct. 7, 2011, and claims the benefit thereof. The International Application claims the benefits of German Application No. 10 2010 042 457.9 DE filed Oct. 14, 2010. All of the applications are incorporated by reference herein in their entirety.

FIELD OF INVENTION

The invention relates to a method for controlling a spot welding system for attaching an inserted element in a hollow member. It also relates to a spot welding system for carrying out said method.

BACKGROUND OF INVENTION

In a steam generator the oxidization heat of a fuel is transferred to a heat carrying medium. The transfer takes place by way of evaporator heating surfaces, in particular by way of tubes, through which the heat carrying medium is conducted and which—generally grouped in blocks—are passed through a combustion chamber or around it. Smooth tubes or tubes with inner ribbing are generally used. The ribs of tubes with inner ribbing, which are provided to create or assist swirling in the flow medium and generally have the form of a helix or screw thread, may be necessary for a number of reasons. These include in particular a low full load mass flow density of the evaporator, a high heat flow density and the resulting risk of film boiling or avoiding flow stratification, which can occur more readily on smooth surfaces than on rough or structured surfaces.

Tubes with inner ribbing are generally produced from a single piece by means of a cold drawing process. However such a cold drawing process has limitations in respect of the composition of the raw material used. For steel alloys for example a chromium content of 5% represents an upper limit for tube production by means of a cold drawing process, as higher chromium contents restrict the shaping capacity of the steel alloy too much.

On the other hand certain operating parameters of an evaporation process may require or advantageously utilize specific material properties, which cannot be achieved with the material compositions that can be permitted for the cold drawing process. For example alloyed steels with chromium contents beyond 5% are required where there are particularly high heat flow densities and/or particularly high temperatures of the heat carrying medium due to the resulting high tube wall temperatures.

Therefore cold drawn tubes with inner ribbing can be replaced by smooth tubes provided with corresponding inserted elements for such applications. One class of such inserted elements is provided for example by helically wound wires or wire mesh, which is/are produced with the aid of a former shaft and inserted into a smooth tube and which rest against the inner surface of the smooth tube so that contact is made due to their torsional stress. To prevent displacement and creep, it is necessary to attach such inserted elements at selected points on the inside of the smooth tube. This is generally achieved by spot welding. As the tube represents a hollow member and the weld points are located on the inside of the tube and are therefore difficult to see, a suitable control method is required for spot welding.

SUMMARY OF INVENTION

A first object is to specify a method for controlling a spot welding system, which is as simple and reliable as possible and also as economical as possible. A second object is to specify a spot welding system for applying such a method.

The first object is achieved by a method as claimed in the claims. According to this a method for controlling a spot welding system for attaching an inserted element in a hollow member is provided wherein the position of the inserted element in the hollow member is determined, the position of an attachment point is determined from the position of the inserted element in the hollow member and a spot welding operation is performed at the attachment point.

The invention is based on the consideration that the geometric configuration of hollow member and inserted element can be determined from the position of the inserted element in the hollow member and from the a priori known shape of the inserted element, it being possible to determine a number of suitable attachment points in turn therefrom.

For a particularly suitable and economical embodiment of the method the position of the inserted element in the hollow member is determined by means of a contact between a contact element of the spot welding system and the inserted element. It is therefore not necessary to detect the location of the inserted element contactlessly. Sensors configured for contactless location detection are generally so sensitive that they have to be moved before every individual welding operation to a minimum distance from the site of the welding operation so that they are not impaired and/or damaged by heat or vapor. Both contactless sensor detection per se and travel paths of sensor or tool units are complex in respect of control technology in particular in confined spatial regions, for example within or in immediate proximity to the inner region of a hollow member, for example a tube, and should therefore be avoided.

The positions of a number of inner surface points of the hollow member are advantageously determined in respect of the location of the hollow member by means of a contact between a contact element of the spot welding system and the inner surface of the hollow member. This allows the inner surface shape of the hollow member to be detected region by region in the manner of a scan.

To form a contact between the contact element and the inner surface of the hollow member, the position of the contact element is expediently varied in respect of the location of the hollow member. This allows the surface points of the inner surface of the hollow member to be gauged and their positions registered. For tubes and tubular hollow members with a defined axis of symmetry a position variation based on cylinder coordinates is particularly advantageous. Thus for example, to determine the inner surface of a tube at predefined points on the longitudinal axis, the contact element can be moved along the radial direction from the inside outward in relation to the axis, until contact is made with the inner surface.

In a further method step the contact element preferably maintains a minimum distance from the inner surface of the hollow member. This is achieved in particular in that, in a region in which the positions of a number of surface points of the inner surface of the hollow member are detected, the contact element is moved away from the surface locally along the surface normal by a predefined distance, in particular around half the diameter of the inserted element. To maintain such a minimum distance in the case of a tube for example, the contact element can be moved back through part of the radius toward the center axis of the tube.

In a further method step the position of the contact element is expediently varied to configure a contact with the inserted element. The position is varied here subject to the basic condition that a minimum distance is maintained between the contact element and the inner surface of the hollow member, at least in a restricted spatial region. This means that the location of the inserted element is gauged in the respective region, without a contact being established with the inner surface of the hollow member. It is thus possible, in a tube in which the contact element has already been moved back through part of the tube radius toward the center axis of the tube, to vary the position of the contact element at a constant distance from and parallel to the center axis, until a contact is achieved, which should then be assigned to the inserted element.

If the inserted element is present as a wire for example in a smooth tube, after gauging the inner wall of the smooth tube the contact element can be pulled back through around half of the wire diameter from the inner wall in the direction of the center axis of the smooth tube. The possibility of the wire being detected is at a maximum at this distance from the inner wall.

In a further method step the position of the inserted element in the hollow member is determined from a contact between the contact element and the inserted element and the position of the contact element in relation to the location of the hollow member. The shape of the inserted element in particular is stored in a memory unit and can be retrieved for this purpose. If the shape of the inserted element is not known and saved, the location of the inserted element can be detected by making contact at a plurality of support points. The location of the inserted element in the hollow member can be defined as required from the positions of said support points.

For the method steps set out above a welding wire is expediently used as the contact element and the contact between the contact element and the hollow member and/or the inserted element is detected by forming an electric contact. The welding wire therefore has an additional function beyond spot welding, so that during the course of the method no additional component has to be used as a contact element. This makes the method particularly simple, fast and efficient, as the number of mechanical movements and travel paths is minimized, in particular in restricted spatial conditions. The forming of an electric contact is also a particularly effective means of detecting a mechanical contact between electrically conductive materials, as are typically present in metal steam generator tubes and corresponding inserted wire elements. A suitably high measuring voltage is applied between the conductors for this purpose, which is in particular not too high, so that flashover is avoided in instances where no mechanical contact is present.

The last mentioned variant of the method is preferably developed so that a measuring voltage is applied at the welding wire, said measuring voltage being short circuited when an electric contact is formed. The short circuit signal is detected on the control side.

In a further expedient embodiment of the method the position of an attachment point on the inner surface of the hollow member is determined as a function of the position of the inserted element in the hollow member. The overall configuration of the hollow member and the inserted element including its cross-sectional shape is taken into account in particular here.

During the course of a further method step the welding wire is preferably passed to the position of the attachment point at a defined distance from the inner surface of the hollow member. If—as in the currently selected example—the inserted element is present as a wire in a smooth tube, the welding wire is expediently passed in such a manner in relation to the inner wall that the end of the welding wire makes contact in the region in which the wire of the inserted element touches the inner wall of the tube.

Spot welding can then be performed. If necessary a number of parameters can be predetermined, which define the nature and scope of the welding operation and/or the welding process.

If it proves necessary, a number of the method steps set out above can be performed repeatedly and/or in a different sequence, in particular during the course of an iterative process. Such a process can be defined on the control side by a number of predetermined parameters, for example by specifying a fixed number of attachment points to which an inserted element is to be welded in a fixed manner in the hollow member or by specifying minimum distances to be maintained in pairs in each instance between the attachment points.

The object relating to the apparatus is achieved by a spot welding system as claimed in the claims. According to this a spot welding system for carrying out a method of the type mentioned above is provided, wherein the spot welding system comprises a control unit, a burner tube that can be moved along a travel path and a burner head connected to the burner tube. It is therefore possible in particular to move the burner tube together with the burner head within hollow spaces, for example within tubes. The method steps mentioned above can be implemented here for an automated or partially automated process in the form of suitable control or regulation sequences by means of hardware and/or software in an electronic control module of the control unit.

BRIEF DESCRIPTION OF THE DRAWINGS

An exemplary embodiment of the inventive method for controlling a spot welding system is described in more detail below with reference to schematic drawings, in which.

Corresponding parts are shown with the same reference characters in the figures.

DETAILED DESCRIPTION OF INVENTION

Figure 1:
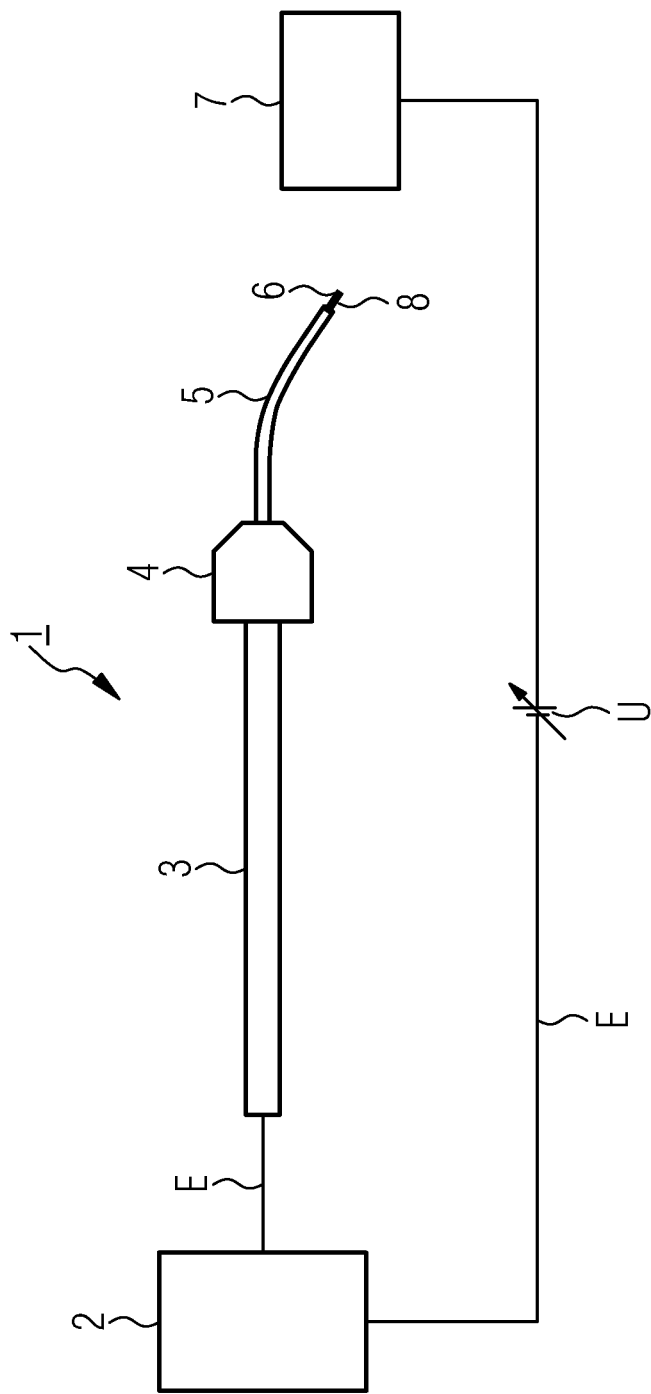
FIG. 1 shows a spot welding system with a control unit, a burner tube and a burner head.

FIG. 1 shows a schematic diagram of a spot welding system 1 with a control unit 2, a burner tube 3 and a burner head 4. Connected to the burner head 4 is a welding lance 5 with a welding wire 6. The welding wire 6 can be used to perform spot welding operations on a metal hollow member 7, in particular in the form of an evaporator tube embodied as a smooth tube 9 of a steam generator used in the power plant domain. The welding wire 6 also functions as a contact element 8, which together with the hollow member 7 forms the two connecting points of an electric power circuit E, which is broken in the contactless state and passes by way of the control unit 2. A mechanical contact between the hollow member 7 and the contact element 8 is detected by way of an electrical short circuit signal in the control unit 2 by applying an electrical voltage U in the power circuit E.

FIGS. 2 to 8 show schematic diagrams of the spot welding system 1 according to FIG. 1 with a smooth tube 9 and a wire-type inserted element 10, which is to be spot welded to the smooth tube 9, during the course of the method. They also show the central longitudinal axis X of the smooth tube 9 and a transverse axis Y orthogonal to the longitudinal axis X in the viewing plane. The wire-type inserted element 10 has the wire diameter δ.

In contrast to the illustration selected here the burner head 4 with the welding lance 5 can be disposed completely within the smooth tube 9 when suitably dimensioned. Means for supplying a protective gas to the weld point defined by the end region or tip of the welding wire 6 can also be provided but are not shown in detail here. During welding with protective gas the melting welding wire 6 is generally continuously repositioned by a motor with variable speed, which is also not shown in detail here to keep the drawings simple. When there is mention in the following of changing the position of the welding wire 6 (more specifically its tip) in the direction of the longitudinal axis X and/or in the direction of the transverse axis Y by moving the welding wire 6 in or out with the aid of a corresponding motor, in particular the motor provided for repositioning during normal welding operation, this could also be done alternatively or additionally by displacing the burner tube 3 by means of a corresponding drive.

Figure 2:
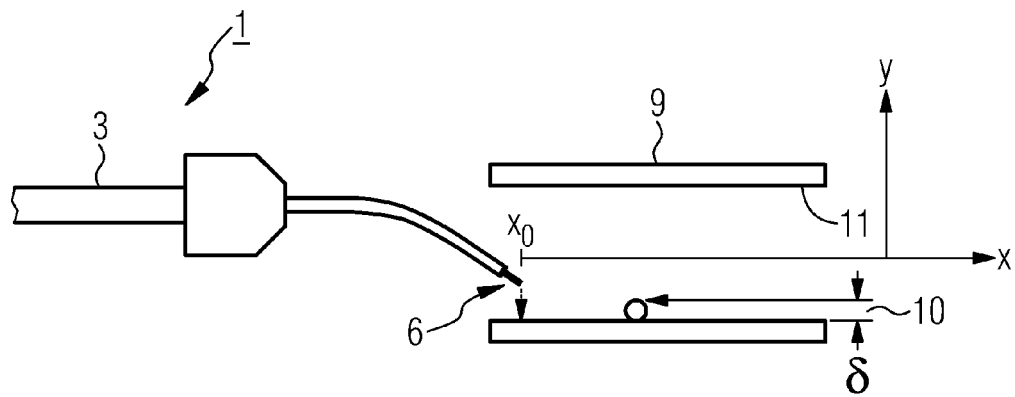
FIGS. 2 to 8 show a series of method steps for welding a smooth tube to a wire-type inserted element with the aid of the spot welding system according to FIG. 1.

FIG. 2 shows a first sequence step of the method. The burner tube 3 is first aligned parallel to the central longitudinal axis X, so that the end of the welding wire 6 is disposed within the smooth tube 9 and assumes the test coordinate $X_0$ in relation to the longitudinal axis X. During the course of the method step the welding wire 6 or the burner tube 3 together with the welding wire 6 is displaced in a direction parallel (or antiparallel) to the transverse axis Y, until the welding wire 6 touches the inner wall 11 of the smooth tube 9. The broken line shows the movement direction of the end of the welding wire 6.

Figure 3:
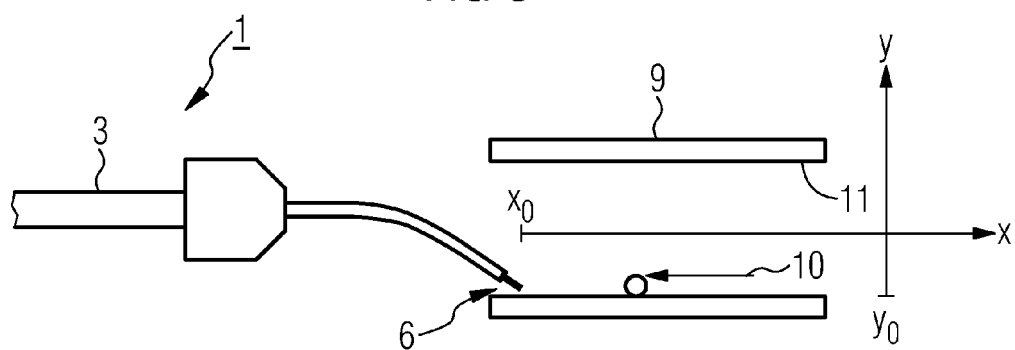

FIG. 3 shows a second sequence step of the method, which follows the sequence step shown in FIG. 2. The contact between the welding wire 6 and the inner wall 11 of the smooth tube 9 is detected by way of a short circuit signal in the control unit 2 (see FIG. 1). The transverse axis coordinate $Y_0$, at which the inner wall is reached, is saved and stored for further use. The welding wire 6 or the burner tube 3 together with the welding wire 6 is then moved back in the direction of the transverse axis Y, in other words toward the tube side opposite the welding side, so that the contact between the welding wire 6 and the inner wall 11 of the smooth tube 9 is broken.

Figure 4:
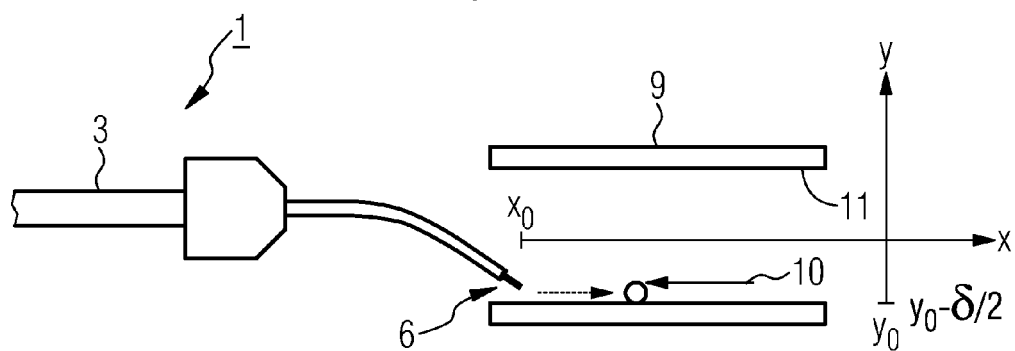

FIG. 4 shows a third sequence step of the method, which follows the sequence step shown in FIG. 3. The movement of the welding wire 6 or the burner tube 3 together with the welding wire 6 in the direction of the transverse axis Y is stopped, as soon as the end of the welding wire 6 is around half the wire diameter δ/2 from the inner wall 11 of the smooth tube 9, thereby assuming the new transverse axis coordinate $Y_0-δ/2$. The wire diameter δ is available as a parameter for this. The welding wire 6 or the burner tube 3 together with the welding wire 6 is then moved parallel to the longitudinal axis X. The travel movement stops as soon as a contact is formed again, this time between the tip of the welding wire 6 and the electrically conducting inserted element, which is already in the desired insertion position making contact with the inner wall 11 of the smooth tube 9. The broken line shows the movement direction of the end of the welding wire 6.

Figure 5:
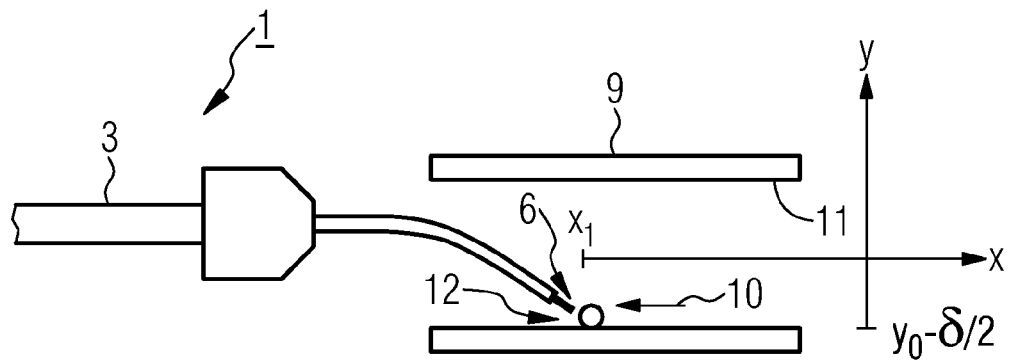

FIG. 5 shows a fourth sequence step of the method, which follows the sequence step shown in FIG. 4. In the control unit 2 a short circuit signal is detected (see FIG. 1), which is assigned uniquely to a contact between the welding wire 6 and the wire-type inserted element 10, as contact between the welding wire 6 and the inner wall 11 of the smooth tube 9 is excluded due to the transverse axis coordinate $Y_0-δ/2$ of the welding wire 6, which is kept constant during the last movement of the welding wire 6. The new longitudinal axis coordinate $X_1$, at which the wire-type inserted element 10 is reached, is saved and stored for later use. The welding wire 6 or the burner tube 3 together with the welding wire 6 is then displaced by an amount that can be defined beforehand based on the cross-sectional geometry of the inserted element parallel to the transverse axis Y and parallel to the longitudinal axis X, so that the end of the welding wire 6 comes to rest in the channel or gap 12 between the wire-type inserted element 10 and the inner wall 11 of the smooth tube 9.

Figure 6:
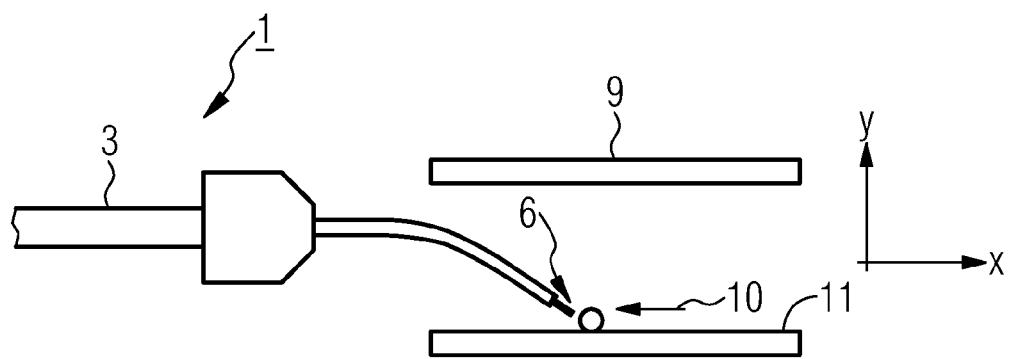

FIG. 6 shows a fifth sequence step of the method, which follows the sequence step shown in FIG. 5. The end of the welding wire 6 is in a favorable position for spot welding the wire-type inserted element 10 to the inner wall 11 of the smooth tube 9.

Figure 7:
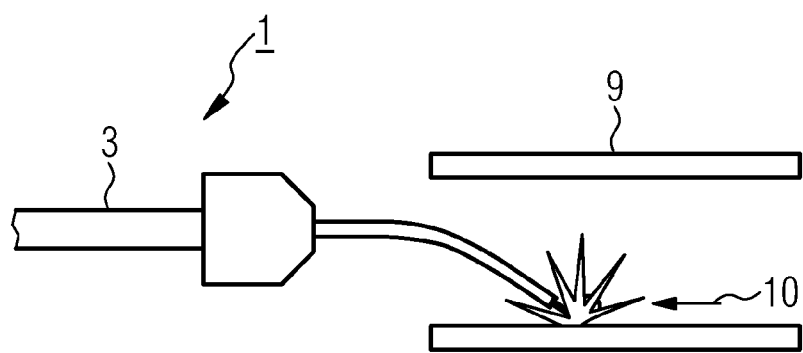

FIG. 7 shows a sixth sequence step of the method, which follows the sequence step shown in FIG. 6. The electrical measuring voltage U (see FIG. 1) provided to determine contact is switched off and the spot welding operation is performed.

Figure 8:
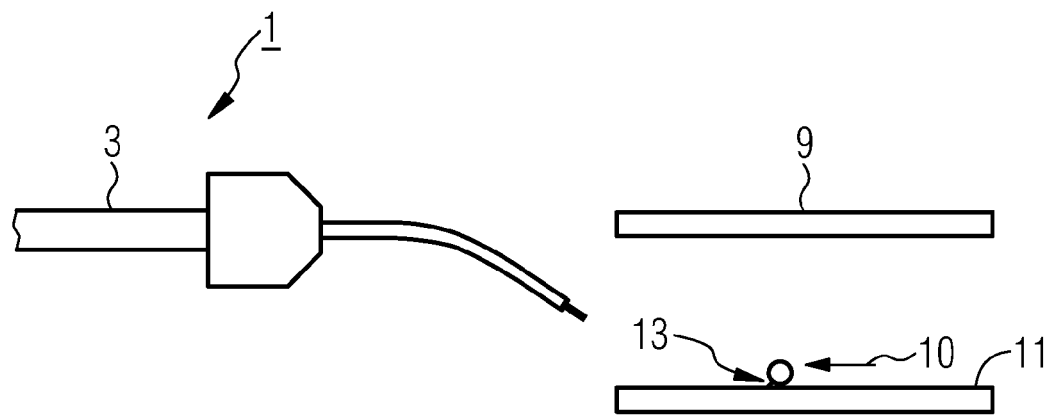

FIG. 8 shows a seventh sequence step of the method, which follows the sequence step shown in FIG. 7. The spot welding operation is completed, the wire-type inserted element 10 is connected in a fixed manner to the inner wall 11 of the smooth tube 9 at the attachment point 13. The spot welding system 1 is moved back to a neutral position or moved into a new starting position to produce a further weld point, perhaps for a further inserted element or at a different point for the same, preferably helically wound inserted element.

Figure 9:
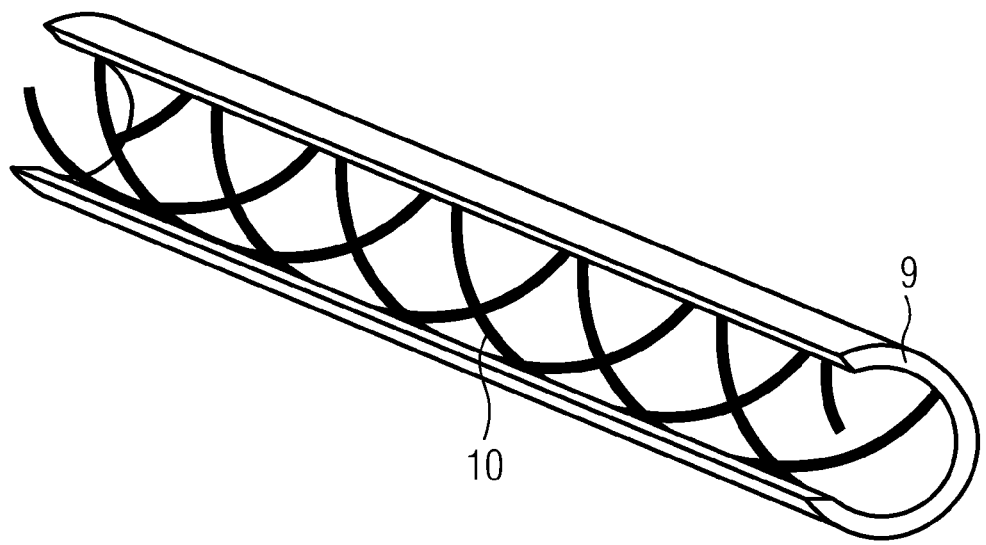
FIG. 9 shows an evaporator tube of a steam generator with an inserted element spot welded to it in the form of a helically wound wire.

The result of the described operations is shown by way of example in FIG. 9. It shows an evaporator tube 9 of a steam generator embodied as a smooth tube with an inserted element 10 spot welded to it at a plurality of attachment points in the form of a wire arrangement with a double helix configuration.

The invention claimed is:

1. A method of controlling a spot welding system for attaching an element into a hollow member, comprising:
  determining a position of the element in the hollow member via a contact between a contact element of the spot welding system and the element, wherein the contact element comprises a welding wire, the determining including:
    determining positions of a plurality of inner surface points of the hollow member relative to a location of the hollow member via the contact between the contact element of the spot welding system and an inner surface of the hollow member,
    storing at least one position of at least one of the plurality of inner surface points of the hollow member,
    calculating a distance from the inner surface of the hollow member using the stored at least one of the plurality of inner surface points of the hollow member,
    moving the contact element in order to establish contact between the contact element and the element such that the contact element maintains the distance from the inner surface of the hollow member, detecting the contact by forming an electric contact, and applying a measuring voltage to the welding wire, wherein the measuring voltage is short-circuited when the electric contact is formed, determining a position of an attachment point based upon the position of the element in the hollow member, performing spot welding at the attachment point.

2. The method as claimed in claim 1, wherein the position of the contact element relative to the location of the hollow member is varied to form the contact between the contact element and the inner surface of the hollow member.

3. The method as claimed in claim 1, wherein the position of the attachment point on the inner surface of the hollow member is determined as a function of the position of the element and a cross-sectional geometry of the element in the hollow member.

4. The method as claimed in claim 1, wherein the hollow member is a steam generator tube with a smooth inner wall.

5. The method as claimed in claim 2, wherein the position of the element in the hollow member is determined based upon the contact between the contact element and the element and the position of the contact element relative to the location of the hollow member.

6. The method as claimed in claim 3, wherein the welding wire is moved a defined distance from the inner surface of the hollow member to the position of the attachment point.

7. The method as claimed in claim 4, wherein the element is a helically wound wire.

* * * * *